United States Patent [19]

Bartl et al.

[11] 4,280,937

[45] Jul. 28, 1981

[54] GRAFT POLYMERS OF POLYSACCHARIDE ESTERS

[75] Inventors: Herbert Bartl, Odenthal; Fritz Mietzsch, Cologne, both of Fed. Rep. of Germany

[73] Assignee: Bayer Aktiengesellschaft, Fed. Rep. of Germany

[21] Appl. No.: 78,843

[22] Filed: Sep. 25, 1979

[30] Foreign Application Priority Data

Sep. 29, 1978 [DE] Fed. Rep. of Germany ....... 2842540

[51] Int. Cl.³ .......................... C08L 1/10; C08L 1/14; C08L 3/16
[52] U.S. Cl. .......................... 260/17 A; 260/17.4 GC
[58] Field of Search ....................................... 260/17 A

[56] References Cited

U.S. PATENT DOCUMENTS

| 3,332,897 | 7/1967 | Ray-Chaudhuri | 260/17.4 GC |
| 3,455,853 | 7/1969 | Dekking | 260/17.4 GC |
| 3,505,257 | 4/1970 | Conte et al. | 260/17 A |
| 4,029,616 | 6/1977 | Nakashio et al. | 260/17.4 GC |

*Primary Examiner*—Edward M. Woodberry
*Attorney, Agent, or Firm*—Connolly and Hutz

[57] ABSTRACT

Graft copolymers of A 2 to 30% by weight of a polysaccharide ester as graft basis, and B 98 to 70% by weight of a grafted monomer mixture of (1) 8 to 90% by weight of ethylene and (2) 92 to 10% by weight of vinyl acetate. The polymers are suitable for the production of moulding compounds, films, packaging foils, and coatings.

8 Claims, No Drawings

GRAFT POLYMERS OF POLYSACCHARIDE ESTERS

The present invention relates to graft polymers of ethylene and vinyl acetate and optionally other comonomers on polysaccharide esters such as cellulose propionate and to the use of such graft polymers for the production of foils.

It is known that very flexible shaped products, in particular foils used for packaging purposes, can be produced from copolymers of ethylene with vinyl acetate or acrylic acid esters. One disadvantage of these foils, however, is that they tend to block, particularly when the proportion of vinyl esters and acrylic esters is more than 10% by weight of the monomers which have been incorporated in the copolymer by polymerisation. It would be particularly desirable to use copolymers, e.g., of ethylene and vinyl acetate, containing from 30 to 50% by weight of polymerised vinyl acetate because foils produced from such copolymers have a rubber-like elasticity, but the tackiness of such foils is particularly severe so that these copolymers are of no practical use for the production of foils for packaging purposes.

From Germany Offenlegungsschrift No. 2,529,547, it is known to polymerise inter alia monomeric esters such as acrylic esters and vinyl acetate in the presence of polymers such as nitrocellulose or cellulose acetobutyrate in an aqueous emulsion. The mixtures of the corresponding polymers in aqueous emulsion obtained by this process can be used as adhesives or for the production of coatings.

It has now been found that graft copolymers obtained by grafting ethylene and vinyl acetate, optionally together with other comonomers, on polysaccharide esters are flexible products which have reduced tackiness as well as other advantageous properties. The graft copolymers can surprisingly be obtained having a high degree of grafting, based on the polysaccharide esters, if the linear polysaccharide esters are dissolved in vinyl acetate, optionally with the addition of other vinyl compounds or of a solvent, which is preferably tertiary butanol, and are then polymerised at elevated pressure with the aid of radical forming initiators after the addition of ethylene.

Accordingly, the present invention provides graft copolymers obtained from
(A) 2 to 30, preferably 5 to 25% by weight of a polysaccharide ester as graft basis and
(B) 98 to 70, preferably 95 to 75% by weight of a grafted monomer mixture of
(1) 8 to 90, preferably 20 to 75% by weight of ethylene and
(2) 92 to 10, preferably 80 to 25% by weight of vinyl acetate and optionally other monomers.
The sums of A and B and, respectively the sums of 1 and 2 are in each case 100%.

The esters of linear polysaccharides are suitable as a graft basis, and particularly suitable are those of cellulose, amylose and pullulan. It is particularly advantageous to use esters of these polysaccharides with aliphatic carboxylic acids having 2 to 4 C atoms, such as acetic acid, propionic acid or butyric acid or mixtures of such acids. Polysaccharide nitrates may also be used, e.g. cellulose nitrate. It is preferred, however, to use the above mentioned carboxylic acid esters of cellulose, in particular cellulose acetopropionate and cellulose acetobutyrate, because the graft products obtained therefrom have exceptionally high transparency as well as other advantageous physical properties.

Processes for the preparation of organic cellulose esters have long been known and have been described, for example in Ullmanns Encyklopädie der technischen Chemie (publishers Urban & Schwarzenberg, Munich-Berlin, 1963) in volume 5, pages 182 to 201.

Preferred cellulose acetobutyrates contain
40 to 50% by weight of butyric acid groups and
15 to 26% by weight of acetic acid groups, and
Cellulose acetobutyrates having the following compositions are particularly preferred as graft basis:
42 to 46% by weight of butyric acid groups and
18 to 22% by weight of acetic acid groups.
Preferred cellulose acetopropionates contain
50 to 66% by weight of propionate acid groups and
1 to 12% by weight of acetic acid groups,
and those containing
54 to 60% by weight of propionic acid groups and
4 to 9% by weight of acetic acid groups are
particularly preferred.

Ethylene and vinyl acetate are used as graft monomers. In addition, carbon monoxide, acrylic and/or methacrylic acid and their $C_1$–$C_8$ alkyl esters may be used as comonomers.

The graft copolymers are prepared by known methods which may be carried out either continuously or in batches. For example, they may be prepared by a process of mass polymerisation in which the polysaccharide ester is dissolved in vinyl acetate and optionally other comonomers, but it is preferred to use a method of solution polymerisation in which an aliphatic alcohol, preferably tertiary butanol, is used as solvent. Polymerisation is carried out in a suitable reactor under pressure after the addition of ethylene with the aid of a radical-forming substance.

The usual radical forming substances may be used as initiators, e.g. organic peroxides such as lauroyl peroxide or di-tertiary butyl peroxide, peroxidicarbonates such as diisopropyl peroxidicarbonate, tertiary butyl hydroperoxide and tertiary butyl perpivalate or readily decomposed azo compounds such as azo-diisobutyronitrile. Polymerisation may, of course, also be induced by short wave radiation. The quantities of initiators used are preferably below 1% by weight, based on the total quantity of graft basis and monomers used.

The pressure range over which polymerisation is carried out is to a large extent dependent upon the quantity of ethylene put into the process or the desired proportion of ethylene in the polymer and also on the polymerisation temperature employed. If a process analogous to that of high pressure polymerisation is employed for the production of graft copolymers with a low vinyl acetate content, polymerisation is carried out at temperatures of from 100° C. to 200° C., preferably of from 100° to 150° C., within a pressure range of from 1,000 to 3,000 bar. For preparing products having a low ethylene content, polymerisation may be carried out within a pressure range of from 20 to 500 bar.

The preparation of the graft copolymers according to the present invention is preferably carried out by solution polymerisation. For solution polymerisation it is suitable to use aliphatic $C_1$ to $C_4$ alcohols, preferably tertiary butanol, in which the polysaccharide esters used as graft basis and also the monomers which are to be grafted on them are dissolved. Solution polymerisation is carried out at a pressure of from 20 to 500 bar and at a temperature of from 50° to 150° C., preferably of from 50° to 100° C. Solution polymerisation has the advantage of resulting in exceptionally high molecular weight products.

For technical process purposes it has been found particularly suitable to employ a method of continuous polymerisation, which is either solvent free or, more preferably, which is in homgeneous solution. Particularly uniform products are obtained under such conditions. Graft copolymerisation carried out with polysaccharide esters in a swollen state may also be of use if the polysaccharide esters are not soluble in the monomer mixture, e.g. as in the case of cellulose acetate.

The total quantity of polysaccharide esters used for the products according to the present invention is to a large extent linked to the ethylene copolymer chains so that the graft copolymers obtained are homogeneous masses. Graft products of this kind are generally completely soluble in aromatic hydrocarbons such as toluene or xylene whereas the polysaccharide esters themselves are insoluble therein.

In addition to lowering the surface tackiness or the tendency of the ethylene copolymers to block, graft copolymerisation on polysaccharide esters has the effects of improving the mechanical strength characteristics, the transparency, the adherence to glass, metal and synthetic materials, and also the oil resistance of the graft polymers. The graft copolymers are suitable for the production of all types of moulding compounds, e.g. for containers, but are particularly suitable for the production of sheet-like products such as films, packaging foils or coatings. The products may, of course, be modified with plasticizers, e.g. polyester plasticizers. Other possibilities for varying the properties of the products of the present invention are by means of mixing them with other polymers such as polyethylene or copolymers of ethylene, e.g. with vinyl acetate and acrylic acid esters, or with the above mentioned polysaccharide esters.

Fillers, plasticizers, processing auxiliaries or pigments may, of course, also be added to the graft copolymers of the present invention.

The following examples serve to further illustrate the present invention.

EXAMPLE 1

A mixture of 1,750 g of vinyl acetate and 10,500 ml of tertiary butanol having dissolved therein 263 g of a cellulose acetobutyrate containing ca. 22% by weight of acetic acid groups and ca. 45% by weight of butyric acid groups, and 8.4 g of azo-bis-isobutyronitrile AIBN) is introduced into an autoclave having a capacity of 20 liters and which is equipped with a stirrer mechanism.

The atmospheric oxygen is removed from the autoclave by washing it twice with ethylene at a pressure of 3 bar and further ethylene is then forced into the autoclave up to a pressure of 100 bar. The autoclave is then heated to 63° C., and the ethylene pressure is raised to 280 bar. Polymerisation is carried out for 18 hours at 63° C. and more ethylene is forced in to maintain the pressure as soon as it decreases by 5 bar. The autoclave is then cooled, the pressure is released, and the polymer is precipitated with water. After drying, there is obtained 3,100 g of a polymer containing 8% by weight of polymerised cellulose ester having a vinyl acetate content of 35% by weight in the ethylene copolymer portion. The viscosity ($\eta$) determined in tetrahydrofuran is 1.126 and the Mooney viscosity is 32. The product is completely soluble in toluene whereas the starting product is insoluble therein. This indicates that a substantial proportion of the cellulose ester has been grafted. A mixture of 92% by weight of an ethylene copolymer containing 35% by weight of vinyl acetate and 8% by weight of cellulose ester constitutes a cloudy, inhomogeneous mass.

EXAMPLE 2

A mixture of 250 g of vinyl acetate and 1,500 ml of tertiary butanol, containing in solution 25 g of the cellulose ester used in Example 1 and 1.2 g of AIBN, is introduced into an autoclave having a capacity of 2.7 liters and which is equipped with a stirrer. Polymerisation is carried out as in Example 1. 300 g of polymer containing 8.3% by weight of the cellulose ester are obtained after drying. The ethylene copolymer portion contains 36% by weight of polymerised vinyl acetate. Viscosity number ($\eta$) 0.94, Mooney viscosity 23.

Glass clear films with high strength can be manufactured from the product of this Example.

EXAMPLE 3

The experiment described in Example 2 is repeated except that 150 g of the cellulose ester, 1.35 g of AIBN, 3.75 g of vinyl acetate and 1,350 ml of tertiary butanol are used. 610 g of a graft copolymer containing 24% by weight of cellulose ester and having a vinyl acetate content in the ethylene copolymer portion of 47% by weight is obtained. Viscosity ($\eta$) 0.97, Mooney viscosity 40.

EXAMPLE 4

The experiment described in Example 2 is repeated except that 25 g of cellulose ester, 126 g of vinyl acetate, 1,200 ml of tertiary butanol and 1.35 g of AIBN are used. 300 g of a graft copolymer containing 8.3% by weight of cellulose ester and having a vinyl acetate content in the ethylene copolymer of 13% by weight is obtained. Mooney viscosity 26.

Transparent, non-tacky films of great strength can be obtained from the product. When coated on glass, the graft polymer is found to adhere very firmly.

EXAMPLE 5

The experiment described in Example 2 is repeated except that 37.7 g of the cellulose ester, 377 g of vinyl acetate, 1,350 ml of tertiary butanol and 1.35 g of AIBN are used.

620 g of a graft copolymer containing 6% by weight of cellulose ester and having a vinyl acetate content of the ethylene copolymer of 45% by weight is obtained ($\eta$) 1.01.

EXAMPLE 6

The experiment described in Example 2 is repeated except that instead of cellulose ester there is used an acetobutyrate of amylose potato starch contaning ca. 20% by weight of acetic acid groups and ca. 45% by weight of butyric acid groups. The product obtained in this Example is also suitable for the manufacture of films.

EXAMPLE 7

The experiment described in Example 2 is repeated except that instead of cellulose ester there is used an acetobutyrate of pullulan containing ca. 24% by weight of acetic acid groups and ca. 42% by weight of butyric acid groups. The product obtained in this Example is also suitable for the production of films.

EXAMPLE 8

The experiment described in Example 1 is repeated except that instead of cellulose ester there is used a cellulose propionate which contains ca. 57.5% by weight of propionic acid groups and ca. 5.5% by weight of acetic acid groups.

2,000 g of a graft copolymer containing 8% by weight of cellulose propionate is obtained. The vinyl acetate content of the ethylene copolymer portion is 32% by weight. The product can be used to produce glass clear, non-tacky plates or foils which combine great flexibility with advantageous strength properties.

EXAMPLE 9

A cascade of 3 stirrer autoclaves, each having a capacity of 5 liters, was continuously charged with the following reactants in the quantities given per hour: 542 g ethylene, 417 g vinyl acetate, 741 g t-butanol, 55 g of the cellulose acetobutyrate used in Example 1 and 0.8 g of AIBN. The temperatures were maintained at 65°, 75° and 85° Centigrade and the pressure was maintained at 200 bar.

A polymer having a Mooney viscosity of 8 (DIN 53 523) and a relative viscosity ($\eta$) of 1.05 dl/g (0.5% in THF) was obtained at a rate of 338 g per hour.

According to the measured saponification number of 320 mg KOH per gramme, the polymer contained 16% by weight of cellulose ester, 37.5% by weight of vinyl acetate and 46.5% by weight of ethylene.

We claim:

1. A graft copolymer comprising
   (A) 2 to 30% by weight of a polysaccharide ester as grafting substrate and
   (B) 98 to 70% by weight of a mixture of
      (1) 8 to 90% by weight of ethylene and
      (2) 92 to 10% by weight of vinyl acetate as grafting monomers.

2. A graft copolymer of claim 1 comprising
   (A) 5 to 25% by weight of a cellulose ester of an aliphatic carboxylic acid having 2 to 4 carbon atoms as grafting substrate and
   (B) 95 to 75% by weight of a mixture of
      (1) 20 to 75% by weight of ethylene and
      (2) 80 to 25% by weight of vinyl acetate as grafting monomers.

3. A graft copolymer of claim 1 wherein (A) is cellulose proprionate.

4. A graft copolymer of claim 1 wherein (A) is cellulose acetobutyrate.

5. A graft copolymer of claim 1 wherein said grafting monomers include at least one monomer selected from the group consisting of carbon monoxide, (meth) acrylic acid, acrylic acid and $C_1$ to $C_8$ alkyl esters of (meth) acrylic and acrylic acids.

6. A graft copolymer of claim 1 prepared by solution polymerization in tertiary butanol at a temperature of from 50° to 100° C.

7. A process for producing a graft copolymer of claim 1 wherein the polysaccharide ester is dissolved in vinyl acetate, ethylene is added and polymerization is continuously carried out at elevated pressure in the presence of a radical forming substance.

8. A foil of the graft copolymer of claim 1.

* * * * *